United States Patent Office 3,333,969
Patented Aug. 1, 1967

3,333,969
PROCESS FOR PRODUCING CARBONATED ICE
William A. Mitchell, Lincoln Park, and Kenneth Ronai, Ridgewood, N.J., and William C. Seidel, Rockland, N.Y., assignors to General Foods Corporation, White Plains, N.Y., a corporation of Delaware
No Drawing. Filed Feb. 1, 1965, Ser. No. 429,626
8 Claims. (Cl. 99—192)

This application is a continuation-in-part of our application Ser. No. 357,813, filed Apr. 6, 1964, and also of our application Ser. No. 96,700, filed Mar. 20, 1961, both of which are now abandoned.

This invention relates to the subdivision of a carbonated ice and the subsequent compacting of the particles of carbonated ice produced by such subdivision.

Carbonated ice is a frozen product of water and gaseous carbon dioxide which, upon contact with an aqueous medium, releases gaseous carbon dioxide. This carbon dioxide can be utilized, for example, to carbonate a beverage, the carbonated ice being located within the beverage so that the carbon dioxide is formed in situ in the beverage. By the term, carbonated ice, is meant any frozen combination of carbon dioxide and water in which the carbon dioxide is present in an amount varying from about 10 to 118 milliliters of $CO_2$ per gram of ice. The carbonated ice may be a hydrate or clathrate, or simply an encapsulation product of carbon dioxide in water.

An important problem present in the handling and use of carbonated ice, particularly in the lower portion of the 10- to 118-volume range, is the uneven release of carbon dioxide gas from the carbonated ice. Such uneven release is manifested in minor explosions or popping of the carbonated ice which, while not of a dangerous nature, may disturb the user and cause liquid in which the carbonated ice is placed to splatter.

It has now been discovered that a carbonated ice capable of releasing a high level of carbon dioxide in a continuous and controlled manner can be produced by a process which comprises subdividing carbonated ice containing about 10 to 118 milliliters of carbon dioxide per gram of water into discrete particles while maintaining the temperature of the ice below 0° C. Stability is enhanced by forming a compacted, adhered mass or briquette of the discrete particles by application of mechanical pressure of between 10 p.s.i.g. and 10,000 p.s.i.g. As used in this application, the term, briquette, is intended to describe a pressure-formed, coherent structure composed of discrete particles, regardless of the outline of the structure. It is not necessary to use distilled water in the formation of the original carbon dioxide-containing ice, and therefore, the term, water, as employed herein is intended to include water with small amounts of natural or added impurities, such as color, flavor and sweetening agents, as well as water per se.

In subdividing the carbonated ice, such as by grinding, it has been found that larger particle sizes of the subdivided product are preferred. Preferable particle sizes will be those which pass a #2 and remain on a #8 U.S. Standard Series screen. Particles having a size smaller than 8 mesh will lose carbon dioxide at a higher rate during the grinding operation and will tend to be unstable relative to carbon dioxide retention during storage. Broadly, however, the carbonated ice may be subdivided to particles having a volume of about one cubic centimeter or less. All such particles will exhibit less tendency to pop in uncontrolled $CO_2$ release than larger particles.

Following subdivision, the small particles of carbonated ice will preferably be compacted. In briquetting or compacting the individual carbonated ice crystals into a coherent mass, it has been observed that the lower the pressure of briquetting the higher the stability of the formed product. The most stable product will be one that has been formed at a pressure as low as 10 p.s.i.g., or at least at the minimum pressure capable of forming a cohesive mass, while the most unstable product will be one that has been formed at pressures of above 3000 p.s.i.g., although pressures as high as 10,000 p.s.i.g. may be used. Of course, at the lowest pressures possible the briquette may tend to disintegrate prior to the time for carbonation. For most carbonation purposes pressures of between 100 and 1000 p.s.i.g. are preferred.

The requirements for the formation of the carbonated ice product which is the starting material used for the process disclosed herein will be briefly reviewed. While the carbonated ice may have as low as 10 volumes of gas per volume of ice, a volume of at least about 25 to 27.5 milliliters of $CO_2$ per gram of ice is preferred. This product, as well as a method for preparing it, are described in U.S. Patent No. 2,975,603 to Barnes et al., issued Mar. 21, 1961. The detailed description of the conditions of formation of the carbonated ice product contained in the above patent is incorporated herein by reference, and the following brief discussion is only included in the interest of clarity.

In forming the carbonated ice product, the temperature during the reaction should be maintained (a) above the freezing point of the aqueous liquid under the prevailing pressure and, preferably, (b) below the gasified ice-freezing temperature range. This will give an operable temperature range of approximately 0° C. to about 14° C. where pure water is used. The mixture of water and carbon dioxide must be maintained under pressure during the reaction period. In order to have the carbon dioxide content at a level of at least 25 to 27.5 milliliters per gram of ice, the pressure should be maintained above 200 p.s.i.g. and can be as high as about 500 to 600 p.s.i.g. The amount of carbon dioxide bound in the ice can be as much as 118 milliliters per gram of ice without destroying the stability characteristics of the product under normal refrigerated storage conditions, i.e., at about −10° C. at atmospheric pressure.

Although the product described in the Barnes et al. patent has good stability and beverage-carbonating characteristics, certain additional advantages are imparted to the final ice by the process of the present invention. These additional advantages include:

(a) Freedom from popping or explosive release of carbon dioxide during carbonation. When carbonated ice is frozen in its final form in situ it develops internal stresses which render the product susceptible to shattering. Grinding apparently relieves these stresses and the briquetting operation does not reintroduce them.

(b) Superior carbon dioxide absorption and retention in the carbonated beverage achieved by the controlled release of $CO_2$.

(c) The ability to precisely control the carbon dioxide content by mixing the ground carbonated ice with water ice prior to briquetting.

(d) The ability to incorporate various additives into the final product.

In accordance with one preferred embodiment of the method of the present invention, a relatively large amount of carbonated ice is formed under the requisite pressure and temperature conditions while the mixture is vigorously agitated. After the formation is complete, the carbonated ice is ground by any conventional method, such as by the use of a hammer mill, so as to form particles of a reduced size, from extremely small particles up to a size having a volume of about one cubic centimeter. A particle size greater than 8 mesh is preferred for good stability.

Particle sizes of less than 8 mesh can have their stability increased by blending powdered sugar or ground water ice with the particles of carbonated ice prior to briquetting. The ground product is then formed into the desired shape under pressure in any conventional forming press, such as a Carver press.

The pressure exerted in forming a briquette from the ice particles should (a) be such that the particles will adhere together to form a coherent mass that will not disintegrate, and (b) be lower than the level at which too much storage stability is vitiated. It has been discovered that at very high mechanical pressures, the formed briquettes lose the ability to be stored successfully at −10° C. While the pressures exerted in forming the briquettes may be from about 10 to 10,000 p.s.i.g., it has been found that at pressures above 3000, and even above 1000 p.s.i.g., losses in carbon dioxide content are encountered. At the lower pressures referred to herein, various nontoxic thickening and adhering agents, such as starches, gums, dextrins and the like, may be mixed with the discrete particles to increase the cohesiveness of the briquettes. In order to avoid melting of any ice in the original reaction product which might cause the releasing of some of the gas, it is essential that the grinding and briquetting operations be performed at temperatures less than 0° C.

Flavor and sweeteners can be added to the briquette by dipping or spraying, if desired. It is another feature of this invention that a water ice glaze or coating can be formed on the briquettes before the flavor and color are added to prevent color and flavor penetration into the ice and increase the stability of the product. The briquette can also be dipped in water containing flavor ingredients to form a film or coating on the briquette. However, when the briquette is to be used in forming carbonated beverages from water, the flavor and sweetening agents must be transferred to the water almost immediately. It is thus preferred to coat these components onto the outer surface of the briquette so that the flavor and sweetening will have dissolved in the drink by the time the carbon dioxide level in the water is sufficient to produce a suitable carbonated drink. The flavor and sweetening agents are preferably coated onto the briquettes after the briquettes have been encapsulated or enrobed with a coating of water ice.

When the briquette is to be used as a frozen confection, the flavor and sweetening constituents should be distributed uniformly throughout the mass so that their effects are imparted to the product throughout consumption. This can be accomplished by the mixing of separate solid flavoring components and sugar or by mixing flavored sugar with the ground carbonated ice reaction product prior to the briquette operation. In such a product, water ice particles will generally also be mixed with the carbonated ice particles and sugar particles prior to compacting to form a briquette.

The invention will be better understood by reference to the following, specific examples of our process.

EXAMPLE I

Carbonated ice was prepared by placing about 300 ml. of water at 25° C. in a Parr pressure reactor of two-liter capacity. The vessel was closed, agitation started, and carbon dioxide was admitted thereto at 500 p.s.i.g. The vessel was placed in a constant temperature bath which maintained the contents at about 4° C. The carbon dioxide feed was adjusted to keep the pressure at 500 p.s.i.g. during the course of the reaction. After 90 minutes, the vessel was removed from the bath, cooled further in a Dry Ice bath, depressurized, and opened. The contents (carbonated ice) were removed and placed in a grinding mill having a temperature therein of about −18° C. which was maintained during the grinding operation. After grinding, the particles had an average size such that they passed through a #3 and remained on a #14 mesh screen (U.S. Standard) and contained about 77 milliliters of carbon dioxide per gram of ice. A portion of the particles weighing 30 gms. was removed from the grinding mill and introduced into a Carver press wherein the temperature was maintained below 0° C. and subjected to mechanical pressure of 750 p.s.i.g. to form a briquette in the shape of a cube having a volume of about 35 cc. This briquette was dropped into 250 ml. of water and a vigorous evolution of gas was observed. The briquette lasted for about the same period of time as did an ordinary ice cube of the same size stirred in an identical glass of water. The bubble size and quantity of gas emitted remained at a relatively constant level for about 10 minutes.

EXAMPLE II

A briquette prepared as in Example I and weighing 30 gms. was dipped into water at 35° F. and the acquired water coating frozen. The briquette was then dipped into a solution of the following composition:

| | Gms. |
|---|---|
| Orange flavor | 2.0 |
| Artificial sweetener (saccharine and sodium cyclamate) | 8.01 |
| Orange color | 0.21 |
| Citric acid | 25.0 |
| Water | 250.0 |

The briquette was then subjected to Dry Ice temperature to freeze the flavor coating. The briquette increased in weight by about 3 gms. When the coated briquette was placed in water, the flavor, color, and sweetening components dissolved within 2 minutes and the water was carbonated.

EXAMPLE III

Thirty grams of the ground particles of carbonated ice made as described in Example I were removed from the grinding mill and placed in a mixing vessel having a temperature of less than 0° C. Ground water ice of an average particle size approximately the same as the size of the particles of carbonated ice and weighing 30 gms. was added to the mixing vessel and the particles were intimately mixed together. The mixture was then placed in a Carver press and formed, under a pressure of 200 p.s.i.g., into a briquette in the shape of a cube and having a volume of about 70 cc., the crystals of carbonated ice being enrobed with a coating of water ice which increased the stability of the product during storage. This briquette had an average carbon dioxide content of 38 milliliters per gram of ice and after storage for two weeks the product retained about 95% of its original carbon dioxide content.

EXAMPLE IV

Another portion of ground carbonated ice (60 gms.) was mixed with 19% by weight with granulated sugar containing 0.05 gm. orange flavor and .005 gm. orange color uniformly dispersed throughout the sugar. The mixture was then briquetted under pressure with a stick placed therein to produce a flavored and sweetened carbonated popsicle product.

It will be apparent that certain alterations and modifications in the process and examples described hereinbefore will be found obvious by those skilled in the art. All such obvious changes are deemed to be included within the scope of the present invention, which is to be limited only by the purview of the following, appended claims.

What is claimed is:

1. A process for producing a carbonated ice that releases carbon dioxide gas in a controlled and continuous manner and without substantial explosive release of said gas upon contact with an aqueous medium, comprising subdividing a larger mass of carbonated ice containing about 10 to 118 milliliters of carbon dioxide per gram of ice into discrete particles and thereby relieving stresses within said larger mass, said particles having a volume not exceeding about one cubic centimeter, while maintaining the temperature of the carbonated ice during subdivision at less than 0° C., and compacting said discrete particles into a cohesive mass at a pressure of about 10 to 10,000 p.s.i.g. while maintaining the temperature of said particles below 0° C., said cohesive mass being characterized by its substantial freedom from popping.

2. A process as claimed in claim 1, in which said discrete particles are compacted into a cohesive mass at a pressure of about 100 to 3000 p.s.i.g.

3. A process as claimed in claim 1, in which said mass of carbonated ice contains at least about 25 to 27.5 milliliters of carbon dioxide per gram of ice.

4. A process as in claim 1 in which an edible adhesive in an amount sufficient to adhere said particles of carbonated ice into a cohesive mass are mixed with said particles prior to compacting.

5. A process as claimed in claim 1 in which said discrete particles have a size such that they pass a #2 and remain on a #8 U.S. Standard Series screen and said pressure is about 100 to 3000 p.s.i.g.

6. A process as in claim 1 further comprising coating said cohesive mass with a film of water ice.

7. A process for producing a carbonated ice which releases carbon dioxide gas in a controlled and continuous manner and without substantial explosive release of said gas upon contact with an aqueous medium, comprising subdividing a larger mass of carbonated ice containing about 10 to 118 milliliters of carbon dioxide per gram of ice into discrete particles and thereby relieving stresses within said larger mass, said particles having a volume not exceeding about one cubic centimeter, while maintaining the temperature of the carbonated ice during subdivision at less than 0° C., mixing said discrete particles of carbonated ice with particles of water ice, and compacting the mixture of particles into a cohesive mass at a pressure of about 10 to 10,000 p.s.i.g. while maintaining the temperature of said particles below 0° C., said cohesive mass being characterized by its substantial freedom from popping.

8. A process as claimed in claim 7, in which particles of sugar are mixed with said particles of carbonated ice and water ice prior to compacting.

References Cited

UNITED STATES PATENTS

| | | | |
|---|---|---|---|
| 850,607 | 4/1907 | Schroder | 62—1 |
| 1,664,850 | 4/1928 | Carney | 99—192 |
| 1,927,175 | 9/1933 | Josephson | 99—192 |
| 2,093,069 | 9/1937 | Bedford | 99—169 X |
| 2,422,790 | 6/1947 | Wiczer | 62—1 X |
| 2,590,542 | 3/1952 | Jones | 252—67 |
| 2,800,456 | 7/1957 | Shepherd | 99—192 |
| 2,975,603 | 3/1961 | Barnes | 99—192 |
| 3,220,204 | 11/1965 | Adler et al. | 62—1 |

A. LOUIS MONACELL, *Primary Examiner.*

R. S. AULL, H. LORD, *Assistant Examiners.*